United States Patent
Nahmani et al.

(10) Patent No.: US 9,144,773 B2
(45) Date of Patent: Sep. 29, 2015

(54) METHOD FOR MANIPULATING A MEMBRANE ELEMENT WITHIN A PRESSURE VESSEL

(75) Inventors: Shalom Nahmani, Eilat (IL); Zur Yagen, Eilat (IL)

(73) Assignee: MEKOROT WATER COMPANY, LTD, Tel-Aviv (IL)

( * ) Notice: Subject to any disclaimer, the term of this patent is extended or adjusted under 35 U.S.C. 154(b) by 67 days.

(21) Appl. No.: 14/238,629

(22) PCT Filed: Aug. 9, 2012

(86) PCT No.: PCT/IL2012/050301
§ 371 (c)(1),
(2), (4) Date: Feb. 12, 2014

(87) PCT Pub. No.: WO2013/024477
PCT Pub. Date: Feb. 21, 2013

(65) Prior Publication Data
US 2014/0209538 A1     Jul. 31, 2014

Related U.S. Application Data (60) Provisional application No. 61/523,463, filed on Aug. 15, 2011.

(51) Int. Cl.
*C02F 1/26* (2006.01)
*B01D 61/22* (2006.01)
(Continued)

(52) U.S. Cl.
CPC ................ *B01D 61/08* (2013.01); *B01D 63/00* (2013.01); *B01D 65/00* (2013.01); *C02F 1/441* (2013.01);
(Continued)

(58) Field of Classification Search
CPC .... B01D 61/00; B01D 61/32; B01D 2311/02; B01D 2313/13; B01D 2313/20; B01D 2313/21; C02F 1/4604
USPC .................. 422/534–535, 501, 513, 521–522; 210/650, 295, 297, 311, 321.67, 210/321.78, 324, 348, 121–122
See application file for complete search history.

(56) References Cited

U.S. PATENT DOCUMENTS

| 4,734,262 | A | * | 3/1988 | Bagshawe | ...................... 422/534 |
| 4,832,850 | A | * | 5/1989 | Cais et al. | ...................... 210/638 |

(Continued)

FOREIGN PATENT DOCUMENTS

CH          640 425  A5     1/1984

OTHER PUBLICATIONS

The International Search Report for International Application No. PCT/IL2012/050301; two pages; mailed Nov. 20, 2012.

*Primary Examiner* — Brian R Gordon
(74) *Attorney, Agent, or Firm* — Vorys, Sater, Seymour and Pease LLP; Ari G. Zytcer (57) ABSTRACT

Provided is a method for manipulating a membrane element within a pressure vessel including a central axis, a distal end, a proximal end and an inlet disposed at the proximal end. The membrane element has a membrane element front face with at least one fluid opening and a membrane element rear face. The membrane element is received within the pressure vessel such that the membrane element front face faces the proximal end, with a possibility to be moved along the central axis by an axial force applied to the membrane element front face. The method includes disposing a fluid-tight element in the pressure vessel to form a fluid chamber at the proximal end between the inlet and the fluid-tight element, and introducing fluid into the fluid chamber to displace the membrane element along the central axis in the direction towards the distal end of the pressure vessel.

18 Claims, 8 Drawing Sheets

(51) Int. Cl.
*B01D 61/08* (2006.01)
*B01D 63/00* (2006.01)
*B01D 65/00* (2006.01)
*C02F 1/44* (2006.01)
*B01D 61/02* (2006.01)
*B01D 61/14* (2006.01)
*C02F 103/08* (2006.01)

(52) U.S. Cl.
CPC .............. *B01D 61/025* (2013.01); *B01D 61/027* (2013.01); *B01D 61/145* (2013.01); *B01D 2311/02* (2013.01); *B01D 2313/02* (2013.01); *B01D 2313/04* (2013.01); *C02F 1/442* (2013.01); *C02F 1/444* (2013.01); *C02F 2103/08* (2013.01)

(56) References Cited

U.S. PATENT DOCUMENTS

| | | | | |
|---|---|---|---|---|
| 4,832,851 | A * | 5/1989 | Bowers et al. | 210/650 |
| 6,117,394 | A * | 9/2000 | Smith | 422/513 |
| 7,832,566 | B2 * | 11/2010 | Leach et al. | 210/380.1 |
| 2008/0295648 | A1 | 12/2008 | Isabelle | |
| 2009/0277826 | A1 * | 11/2009 | Pedersen et al. | 210/321.78 |
| 2011/0259824 | A1 * | 10/2011 | Neubrand et al. | 210/638 |
| 2012/0085712 | A1 * | 4/2012 | Moss | 210/789 |
| 2012/0202193 | A1 * | 8/2012 | Heinrich | 435/5 |
| 2013/0130401 | A1 * | 5/2013 | Kanda et al. | 436/178 |
| 2013/0202656 | A1 * | 8/2013 | Ericson | 424/400 |
| 2013/0203089 | A1 * | 8/2013 | Wingo et al. | 435/7.92 |
| 2015/0076069 | A1 * | 3/2015 | Ellis et al. | 210/663 |

* cited by examiner

METHOD FOR MANIPULATING A MEMBRANE ELEMENT WITHIN A PRESSURE VESSEL

FIELD OF THE INVENTION

This invention relates to desalination system and water treatment system. Specifically, the presently disclosed subject matter is concerned with methods for manipulating a membrane element within a pressure vessel.

BACKGROUND OF THE INVENTION

Different types of feed water (e.g., brackish water, seawater, treated wastewater, etc.) can be treated in order to be purified and converted to fresh water so it is suitable for human consumption, irrigation or industrial use. This water can be treated by different techniques, one of which is the reverse osmosis technique. According to this technique, pressure is used to force salty feed water against membranes sheets disposed in a membrane element which allow relatively salt free water to pass through. The membrane sheets which are used for reverse osmosis can have a dense barrier layer in a polymer matrix where most separation occurs. The water can are be treated in other techniques such as nanofiltration and ultrafiltration, in which other types of membranes can be used. In most cases, the membrane sheet is designed to allow only water to pass through this dense layer, while preventing the passage of solutes (such as salt ions). This process requires that a high pressure be exerted on the high concentration side of the membrane element, usually 40-70 bar for feed water which is seawater, which has around 27 bar (390 psi) natural osmotic pressure that must be overcome.

The membrane element in which the membrane sheets are disposed is usually installed inside a pressure vessel. From time to time, there may be a need to extract the membrane element from the pressure vessel for different necessities such as maintenance or replacement. The extraction of the membrane element from the pressure vessel can be a difficult task, for example, when the membrane element is tightly received within the pressure vessel, when the pressure vessel is disposed high in the desalination system, or when there is an accumulation of salts between the membrane element and the pressure vessel.

Therefore, there is need to develop a method according to which the membrane element can be manipulated and moved within the pressure vessel.

SUMMARY OF THE INVENTION

The presently disclosed subject matter, in its one aspect, provides a method for manipulating a membrane element within a pressure vessel. This method is adapted to facilitate extraction of the membrane element from the pressure vessel by using a hydraulic force. The presently disclosed method can replace other techniques for extracting a membrane element from a pressure vessel. One example of these other techniques is extraction of the membrane element which is performed by a worker that uses a pushing rod for manually pushing the membrane element out of the pressure vessel. In this example, more than one worker may be required for extracting the membrane element from the pressure vessel. The membrane elements and the pressure vessels of the presently disclosed subject matter can be used in various water desalination and/or treatment system such as nanofiltration systems, ultrafiltration systems, and reverse osmosis systems.

By using the presently disclosed method, one worker can be required in order to extract the membrane element from the vessel.

The pressure vessel has a central axis, a distal end, a proximal end and an inlet disposed at the proximal end. The membrane element has a membrane element front face with at least one fluid opening and a membrane element rear face. The membrane element can be received within the pressure vessel such that the membrane element front face faces the proximal end, with a possibility to be moved along the central axis by an axial force applied to the membrane element front face.

According to one aspect, the method for manipulating the membrane element within the pressure vessel comprises at least the following steps: disposing a fluid-tight element in said pressure vessel so as to form a fluid chamber at the proximal end between the inlet and the fluid-tight element. The fluid-tight element is configured for sealing at least said one fluid opening of the membrane element, thereby preventing the membrane element from receiving therein fluid through at least said one opening from said fluid chamber; and, introducing fluid (e.g., liquid, water, gas) into the fluid chamber so as to build a fluid pressure within the fluid chamber forcing the fluid-tight element to move away from the inlet and to apply an axial force on the membrane element, thereby displacing the membrane element along the central axis in the direction towards the distal end of the pressure vessel.

The method according to the presently disclosed subject matter can be used with any known pressure vessel with at least one membrane element received therein.

The fluid-tight element can be made of a material which is not permeable to fluid so as to provide sealing between the fluid chamber and the interior of the pressure vessel.

The inlet can have different dimensions, and can comprise fluid-tight elements which are configured for confine fluid within the fluid chamber and prevent its exit from the inlet.

The method for maneuvering the membrane element within the pressure vessel can additionally comprises a step of fixedly mounting an end-plate at the inlet, such that the fluid chamber is formed in the proximal end between the end-plate and the fluid-tight element. The end-plate can have a port configured for introducing fluid into the fluid chamber.

The fluid chamber can be any sealed chamber with a port through which fluid can be introduced therein. The fluid chamber can accumulate the fluid which is introduced therein, and can have an ability to enlarge its volume when a predetermined fluid pressure of the accumulated fluid is achieved. The enlargement of the volume can be provided by a moving element, such as the fluid-tight element, which is moved within the pressure vessel when the predetermined fluid pressure is achieved within the fluid chamber.

The step of disposing a fluid-tight element in the pressure vessel can further comprise a step of causing the fluid-tight element to abut the membrane element front face. Alternatively, the fluid-tight element can be disposed in the pressure vessel without touching the membrane element front face. In this case, only after the introduction of fluid into the fluid chamber, the fluid-tight element will be moved by the fluid towards the membrane element front face, and mounted thereto.

The method can further comprise a step of mounting the fluid-tight element to the membrane element front face before the introduction of the fluid therein. Alternatively, the mounting of the fluid-tight element to the membrane element front face can be performed after the introduction of the fluid into the fluid chamber.

The fluid-tight element can have a front member face corresponding in shape and dimensions to the membrane element front face for at least partially sealing it.

The pressure vessel can have a cylindrical inner surface with a diameter D1, the membrane element front face can have a circular shape with a diameter D2, and the fluid-tight element can have a circular shape with a diameter D3, such that D3<D2<D1 or D2≤D3<D1.

The membrane element can have a central fluid passage having a front passage end at the membrane element front face and a rear passage end at the membrane element rear face, and a number of fluid openings including the at least one fluid opening of the membrane element can be disposed around the front passage end. The fluid-tight element can have a plug configured for being sealingly received at the front passage end when the fluid-tight element is used for sealing the fluid openings of the membrane element.

The fluid-tight element can be configured for being screwed into the front passage end. In this case, the plug of the fluid-tight element can have a thread.

The fluid-tight element can have a peripheral sealing member configured for being disposed between the fluid-tight element and the membrane element front face for preventing passage of fluid therebetween.

The method can further comprise a step of controlling the fluid pressure of fluid in the fluid chamber, thereby controlling the displacement of the membrane element within the pressure vessel.

The method can further comprise a step of controlling a source pressure of fluid introduced into the fluid chamber, and optionally further including establishing the source pressure value between 1 bar and 8 bar. The source pressure can be a relatively low with respect to the pressure of the feed water which is introduced into the membrane element during a desalination of the feed water.

The method can further comprise a step of terminating the displacement of the membrane element within the pressure vessel by extracting the membrane element from the distal end of the pressure vessel.

The membrane element can constitutes a first membrane element disposed in the pressure vessel and the pressure vessel can further comprise at least another membrane element received within the pressure vessel between the first membrane element and the distal end of the pressure vessel, In this case, the displacement of the first membrane element within the pressure vessel by the fluid-tight element can cause a corresponding displacement of the another membrane element.

According to a further aspect of the presently disclosed subject matter, the method for manipulating a membrane element within a pressure vessel comprises steps of: disposing a fluid-tight element in said pressure vessel so as to form a fluid chamber at said proximal end between said inlet and said fluid-tight element, said fluid-tight element being configured for sealingly mounted with respect to an inner surface of the pressure vessel so as to prevent the membrane element and the passage between the membrane element and the inner surface from receiving therein fluid from said fluid chamber; and, introducing fluid into said fluid chamber so as to build a fluid pressure within said fluid chamber forcing said fluid-tight element to move away from said inlet and to apply an axial force on said membrane element, thereby displacing the membrane element along said central axis in the direction towards said distal end of the pressure vessel.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
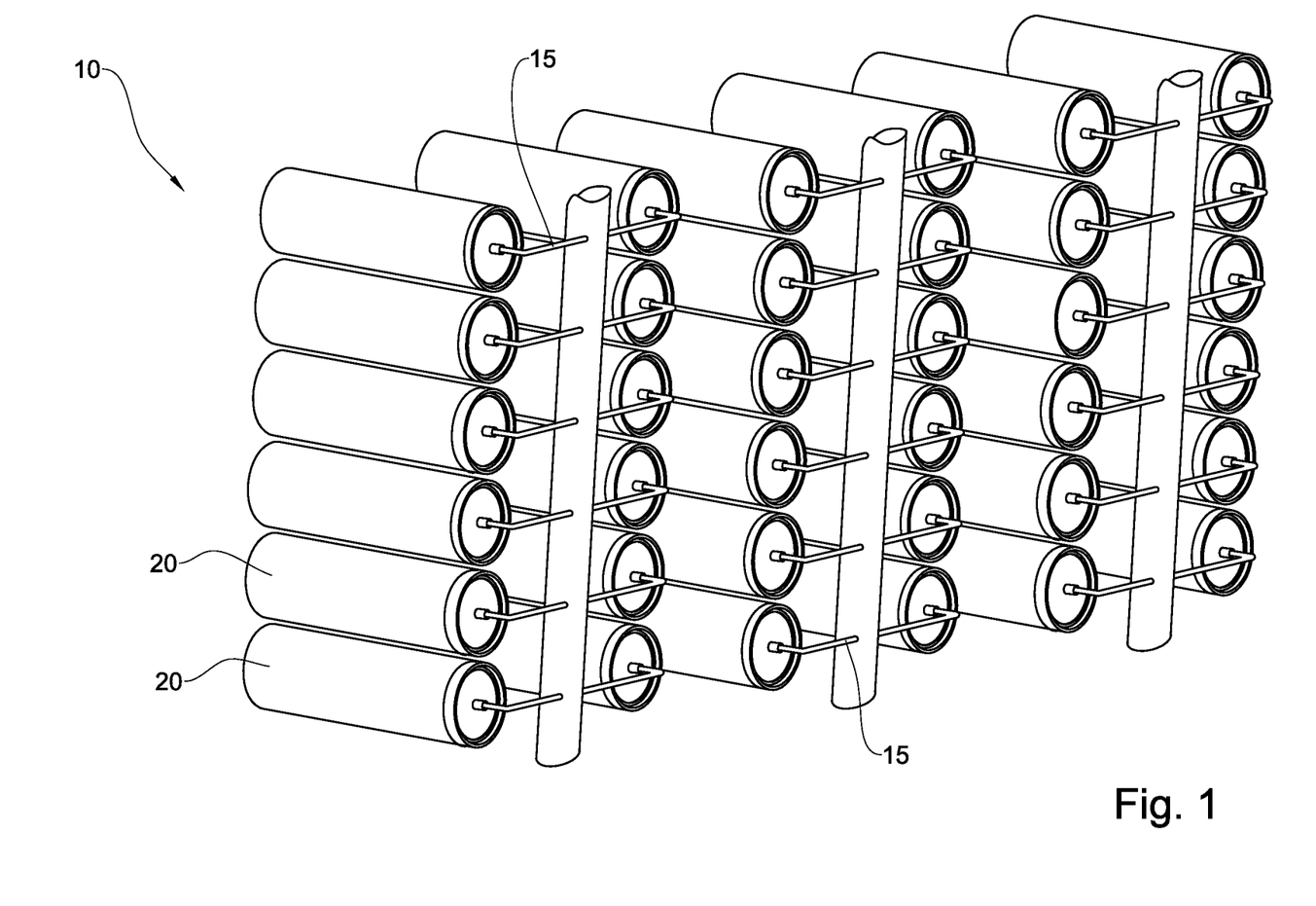
FIG. 1 illustrates a prospective view of an example of a desalination system in which the presently disclosed method can be used.

Attention is first directed to FIG. 1 illustrating one example of a desalination system, generally designated 10, in which a method in accordance with the present disclosed subject matter can be used. The desalination system 10 of the example of FIG. 1 is a reverse osmosis system. According to other examples, the desalination system 10 can be a nanofiltration system or an ultrafiltration system.

The system 10 comprises a plurality of pressure vessels 20 that are in fluid communication with inlet pipes 15 for receiving therefrom feed water (e.g., sea water) to be desalinated, and membrane elements mounted within the pressure vessels 20 for passing the feed water therethrough for its desalination.

Figure 2:
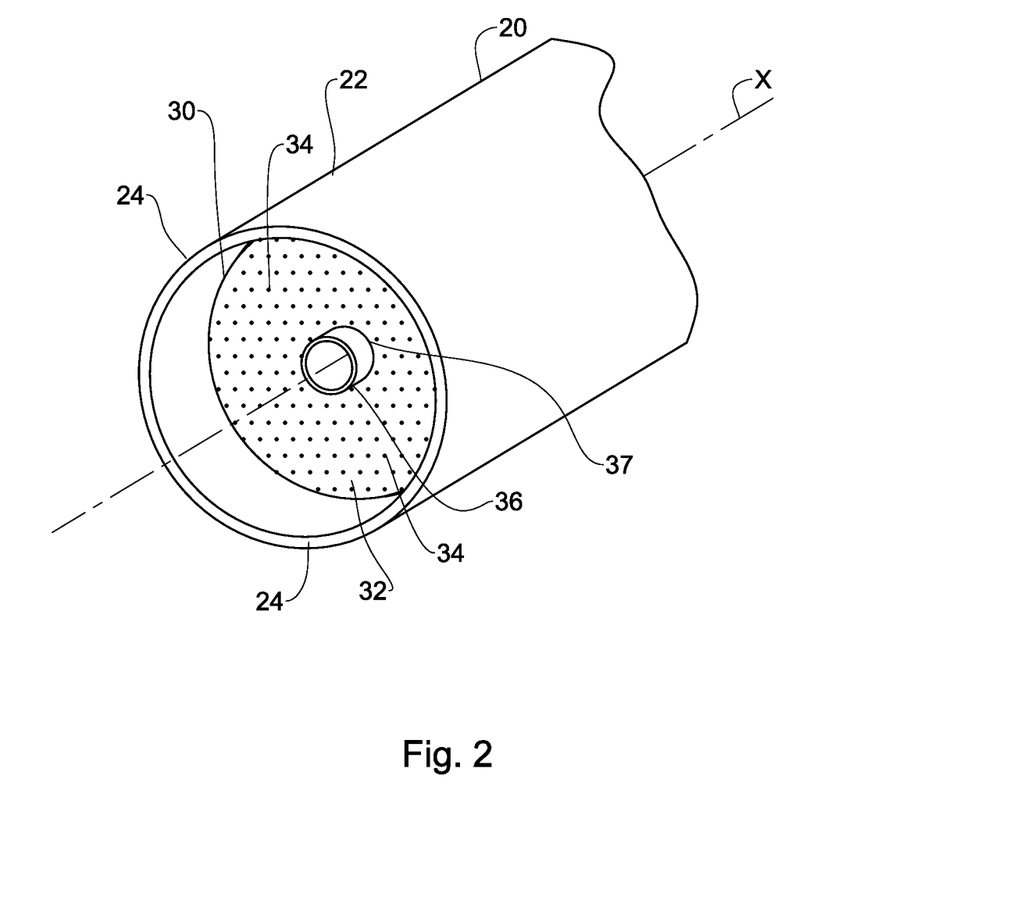
FIG. 2 illustrates a prospective view of an example of a pressure vessel with a membrane element received therein according to one example of the presently disclosed subject matter.

FIG. 2 illustrates a portion of a pressure vessel 20 of the desalination system 10 in a detailed manner, when the inlet pipes 15 are disconnected therefrom. The pressure vessel 20 has a central axis X, a distal end 21 (shown in FIGS. 6A-B), a proximal end 22, and an inlet 24 disposed at the proximal end 22. The pressure vessel 20 has a membrane element 30 received therein. The membrane element 30 has a membrane element front face 32 with a plurality of fluid openings 34, a membrane element rear face (not shown) located at the other end of the membrane element 30, and a central fluid passage 36 extending between the membrane element front face 32 and the membrane element rear face. The central fluid passage 36 has a front passage end 37 disposed at the membrane element front face 32 and a rear passage end (not shown) disposed at the membrane element rear face. The openings 34 are disposed around the front passage end 37. The membrane element 30 can be moved along the central axis X when an axial force is applied on it. For example, the membrane element 30 can be extracted from the vessel 20 through the distal end of the pressure vessel 20 when a pushing force is applied on its membrane element front face 32.

The membrane element 30 comprises a plurality of semi-permeable membrane sheets (not shown) through which the feed water which enters the membrane element 30 via the openings 34 being desalinated. In the desalination process, the openings 34 are configured to receive the feed water via the inlet 24 of the vessel 20, to transfer it through the semi-permeable membrane sheets of the membrane element 30 for receiving a product water, to collect the product water (e.g., desalinated water, drinking water) in the central fluid passage 36, and to extract the product water via the rear passage end to a product water pipe (not shown). By using this process, the product water which exits from the membrane element 30 can have less solutes and/or other solvents than the feed water. The solutes and/or other solvents which are not able to pass through the semi-permeable membrane sheets can be evacuated from the membrane element by a concentrate water being used for washing thereof.

From time to time, there can be a need to extract the membrane element 30 (or a plurality of membrane elements) from the vessel 20 for various needs such as, maintenance, cleaning, replacement, checking, and the like. In order to fulfill this need, a method according to the presently disclosed subject matter, for manipulating the membrane element 30 within the vessel 20, can be used in three general steps.

Figure 3A:
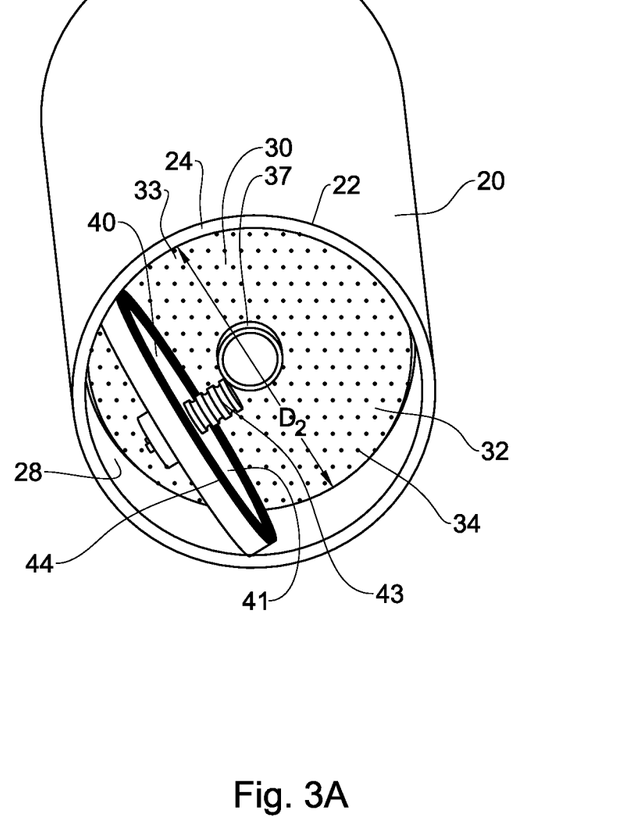
FIGS. 3A and 3B illustrate a prospective view of an example of a pressure vessel with a membrane element received therein, and a fluid-tight element received within the pressure vessel according to one example of the presently disclosed subject matter.
Figure 3B:
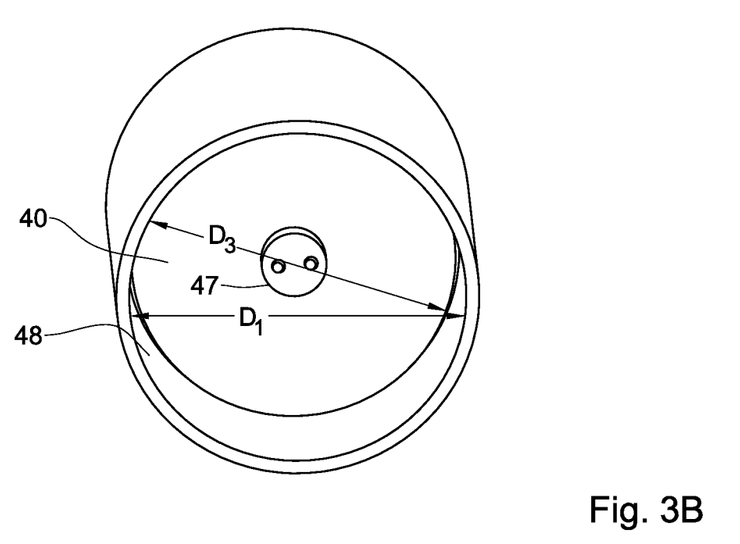
Figure 5A:
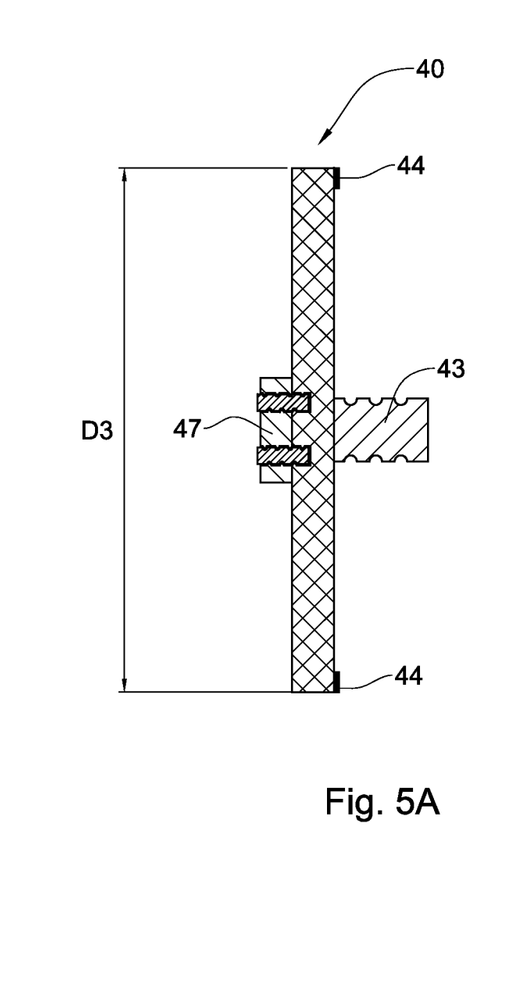
FIGS. 5A-B illustrate a cross-sectional view and a prospective view, respectively, of a fluid-tight element according to one example of the presently disclosed subject matter; and, FIGS. 6A-C illustrate a cross-sectional view of an pressure vessel with a membrane element received therein, according to one example of the method of the presently disclosed subject matter.
Figure 5B:
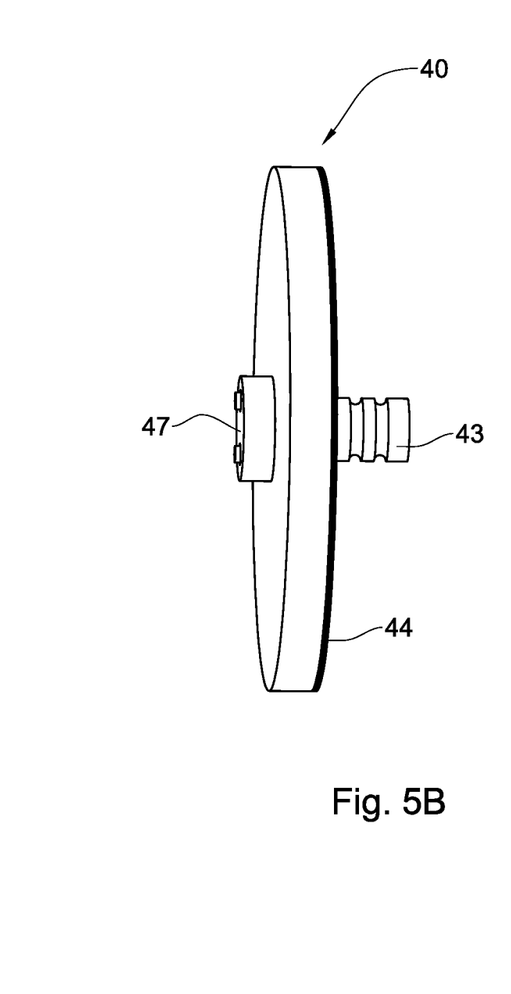

The first step of the presently disclosed method is illustrated in FIGS. 3A-B, in which a fluid-tight element 40 is inserted into the proximal end 22 of the pressure vessel 20 via the inlet 24. FIG. 3A illustrates the fluid-tight element 40 being disposed with the proximal end 22, but not mounted the membrane element 30. Following the insertion of the fluid-tight element 40 into the proximal end 22, the fluid-tight element 40 can be disposed proximally to the membrane element front face 32 and mounted thereto. In this position, which is shown in FIG. 3B, the fluid-tight element 40 can seal the openings 34 of the membrane element 30, so as to prevent the membrane element 30 from receiving therein fluid through the openings 34. Moreover, according to one example, when mounted within the pressure vessel, there may be a sealing between the fluid-tight element and the inner surface of the As shown in FIG. 3A, the fluid-tight element 40 has a front member face 41 corresponding in shape and dimensions to the membrane element front face 32 for sealing it. The pressure vessel 20 has a cylindrical inner surface 48 with a diameter D1 (e.g. D1 has a value of 8"), the membrane element front face 32 has a circular shape with a diameter D2, and the fluid-tight element 40 has a circular shape with a diameter D3, such that D2<D3<D1. The fluid-tight element 40 has a plug 43 configured for being received at the front passage end 37 of the central fluid passage 36 when the fluid-tight element is mounted to the membrane element front face 32 for sealing the fluid openings 34. The fluid-tight element 40 has a grip 47 configured for holding the fluid-tight element 40, for example, during its mounting to the membrane element 30. The fluid-tight element 40 has a peripheral sealing member 44 configured for being disposed between the fluid-tight element 40 and the inner surface 48 for preventing passage of fluid therebetween. FIGS. 5A and 5B illustrate a cross-sectional and a prospective view of the fluid-tight element 40, respectively. In these figures illustrated the fluid-tight element 40 with the grip 47, the sealing member 44, and the plug 43 which is configured for being received within a respective recess (not shown) disposed at the front passage end 37.

Figure 3C:
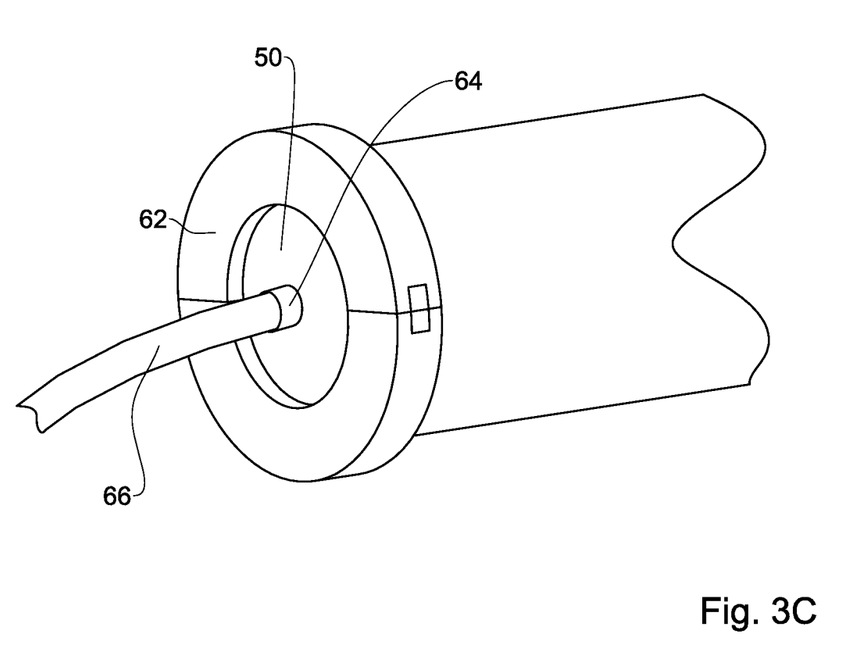
FIG. 3C illustrates a prospective view of an example of a pressure vessel with a membrane element received therein, and an end-plate mounted to the inlet of the pressure vessel according to one example of the presently disclosed subject matter.

The second step of the presently disclosed subject matter is illustrated in FIG. 3C, in which an end-plate 50 is received at the inlet 24, so as to form a fluid chamber 60 (illustrated in FIGS. 6A-B) between the end-plate 50 and the fluid-tight element 40. The end-plate 50 can be fixed to the proximal end 22 of the vessel 20 by a connector 62. The end-plate 50 has a port 64 to which a pipe 66 can be connected for introducing fluid into the fluid chamber 60.

Figure 4:
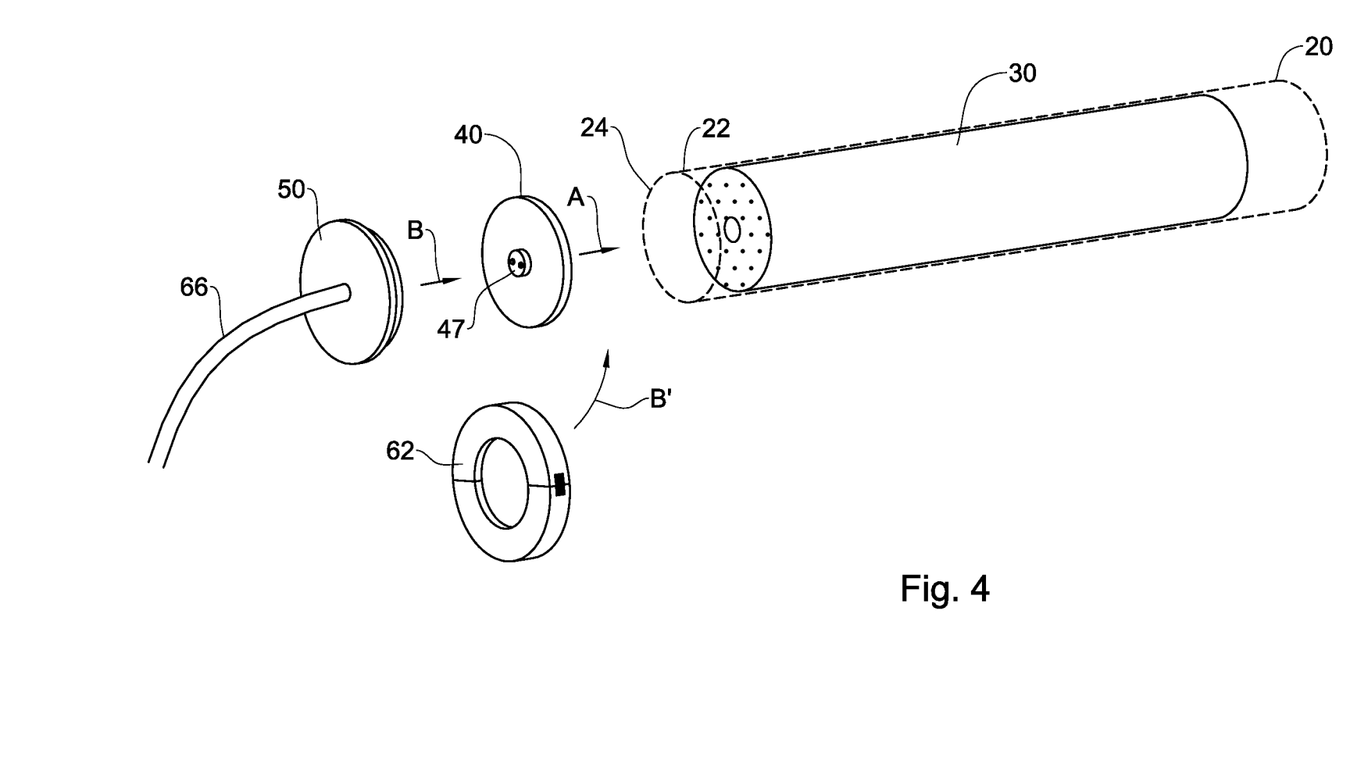
FIG. 4 illustrates a prospective view of a pressure vessel with a membrane element received therein, a fluid-tight element, an end-plate, and a connector according to one example of the presently disclosed subject matter.

Reference is now made to FIG. 4 which schematically illustrates a prospective view of the elements used in the first and the second steps of the presently disclosed method in the desalination system 10. The elements are the following: vessel 20 (presented in a striped line), membrane element 30 received therein, fluid-tight element 40, end-plate 50, and connector 62. FIG. 4 illustrates the steps for forming the fluid chamber 60 (shown in FIGS. 6A-B) at the proximal end 22 of the pressure vessel 20. In the first step, which is generally designated as A, the end-plate 50 can be inserted into the proximal end 22 and mounted to the membrane element front face 32. In the second step, which is generally designated as B, the end-plate 50 can be received at the inlet 24, and followed another step, generally designated as B', in which the connector 62 is used for fixing the end-plate 50 to the proximal end 22.

Figure 6A:
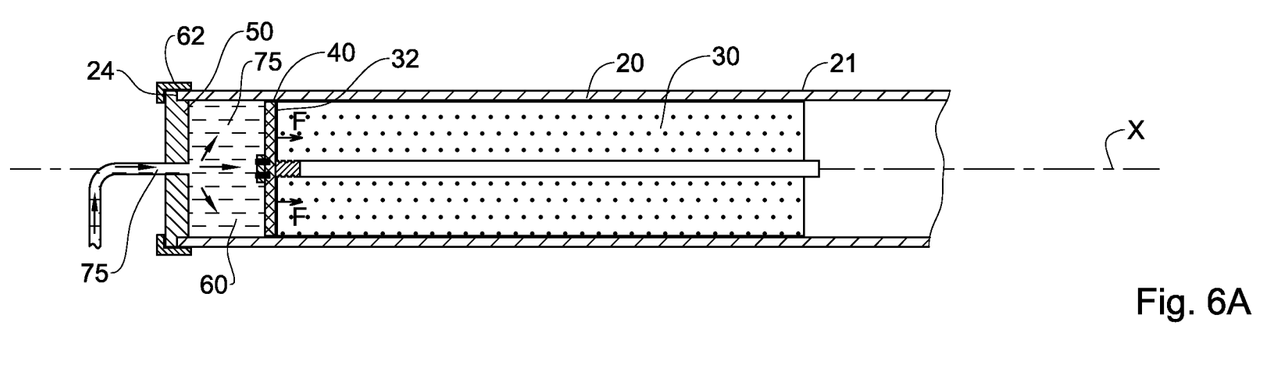
Figure 6B:
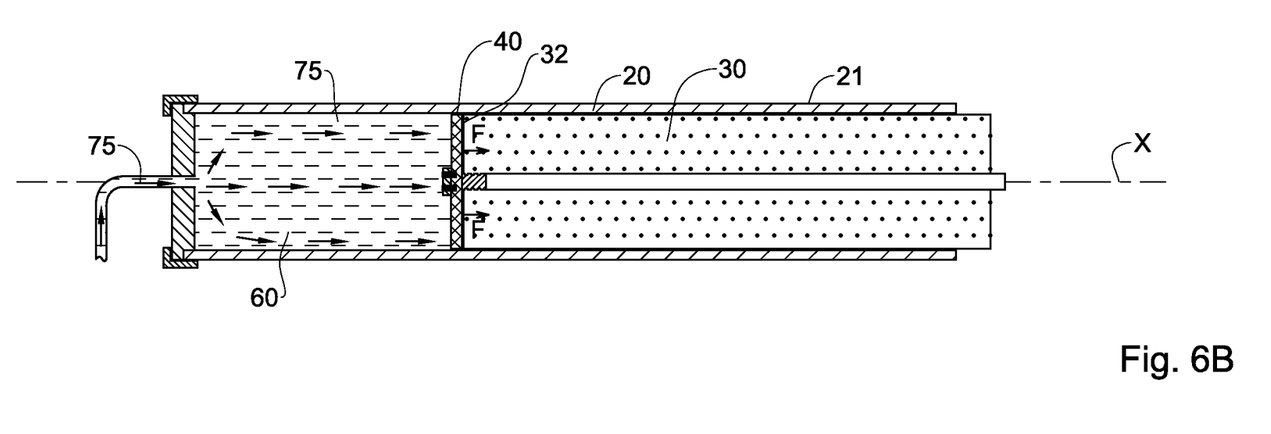
Figure 6C:
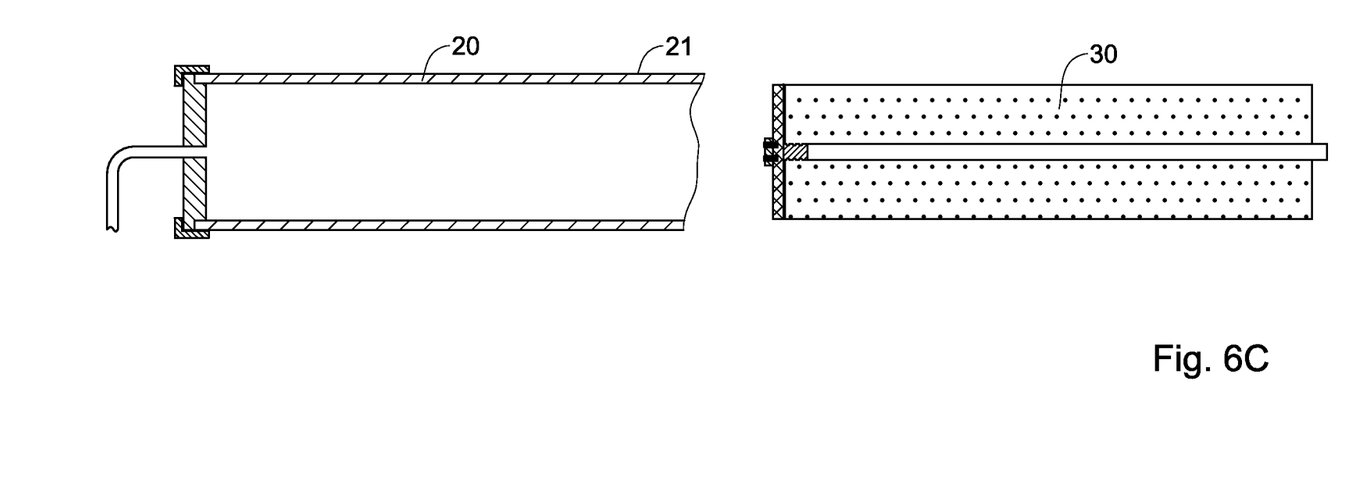

The third step of the presently disclosed method is illustrated in FIGS. 6A-B, in which a cross-sectional view of the pressure vessel 20 with the membrane element 30 is presented. According to the third step, a fluid 75 is introduced into the fluid chamber 60 so as to build a fluid pressure within the fluid chamber 60. The fluid pressure built within the fluid chamber 60 forces the fluid-tight element 40 to move away from the inlet 24 towards the distal end 21 of the pressure vessel 20. This movement is followed by application of an axial force F on the membrane element front face 32 of the membrane element 30. The axial force F pushes the membrane element 30 and causes displacement thereof along the central axis X in the direction towards the distal end 21 of the pressure vessel 20. If the introduction of the fluid 75 into the fluid chamber 60 is not stopped, the third step can be terminated by full extraction of the membrane element 30 from through distal end 21 of the pressure vessel 20, as shown in FIG. 6C.

The introduction of the fluid 75 into the fluid chamber 60 can be controlled by changing the pressure of the fluid, i.e., source pressure, and establishment of its value at between 1 and 8 bar. The change of the source pressure value can change the fluid pressure which is built within the fluid chamber 60, and this can influence on the displacement of the membrane element 30 within the pressure vessel 20.

According to other examples, in which the pressure vessel is longer or the membrane element is shorter, an array of membrane element (which has two or more membrane elements) can be received in a pressure vessel. In this case, the presently disclosed method can be implemented to the membrane element front face of the first membrane element of the array of membrane elements, and during the introduction of the fluid into the fluid chamber, the displacement of the first membrane element will cause a corresponding displacement of the other membrane elements within the pressure vessel.

According to another example, another element can be used instead of the end-plate. This element can be mounted to the inlet of the pressure vessel for providing a fluid chamber which is stable to the fluid pressure built therein for displacement of the membrane element within the pressure vessel.

The method according to the presently disclosed subject matter can also be used in other examples in which the membrane element and/or the vessel have different structure and/or function.

The invention claimed is:

1. A method for manipulating a membrane element within a pressure vessel, said pressure vessel having a central axis, a distal end, a proximal end and an inlet disposed at said proximal end, said membrane element having a membrane element front face with at least one fluid opening and a membrane element rear face, said membrane element being received within said pressure vessel such that said membrane element front face faces said proximal end, with a possibility to be moved along said central axis by an axial force applied to said membrane element front face, said method comprising steps of:

disposing an end plate at the inlet at the proximal end and a fluid-tight element in said pressure vessel so as to form a fluid chamber at said proximal end between said inlet and said fluid-tight element, said fluid-tight element being configured for sealing at least said one fluid opening of the membrane element, thereby preventing the membrane element from receiving therein fluid through at least said one opening from said fluid chamber; and introducing fluid into said fluid chamber so as to build a fluid pressure within said fluid chamber forcing said fluid-tight element to move away from said inlet and to apply an axial force on said membrane element, thereby displacing the membrane element along said central axis in the direction towards said distal end of the pressure vessel.

2. The method as claimed in claim 1, wherein said step of disposing a fluid-tight element in the pressure vessel further comprises a step of causing said fluid-tight element to abut said membrane element front face while preserving sealing between an inner surface of the pressure vessel and the fluid-tight element.

3. The method as claimed in claim 1, further comprising a step of mounting the fluid-tight element to the membrane element front face.

4. The method as claimed in claim 1, wherein the fluid-tight element has a front member face corresponding in shape and dimensions to the membrane element front face for at least partially sealing it.

5. The method as claimed in claim 1, wherein said pressure vessel has a cylindrical inner surface with a diameter D1, said membrane element front face has a circular shape with a diameter D2, and said fluid-tight element has a circular shape with a diameter D3, such that $D3<D2<D1$ or $D2 \leq D3<D1$.

6. The method as claimed in claim 1, wherein said membrane element has a central fluid passage having a front passage end at said membrane element front face and a rear passage end at said membrane element rear face, and wherein a number of fluid openings comprising said at least one fluid opening are disposed around said front passage end, and said fluid-tight element has a plug configured for being sealingly received at said front passage end when the fluid-tight element is used for sealing said fluid openings.

7. The method as claimed in claim 6, wherein said plug is configured to fit said front passage end in size and dimensions.

8. The method as claimed in claim 1, wherein said fluid-tight element comprises a peripheral sealing member configured for being disposed between said fluid-tight element and said membrane element front face for preventing passage of fluid therebetween.

9. The method as claimed in claim 1, further comprising a step of controlling the fluid pressure of fluid in said fluid chamber, thereby controlling the displacement of said membrane element within said pressure vessel.

10. The method as claimed in claim 1, further comprising a step of controlling a source pressure of fluid introduced into said fluid chamber, and optionally further comprising establishing said source pressure value between 1 bar and 8 bar.

11. The method as claimed in claim 1, wherein said endplate has a port configured for introducing fluid into said fluid chamber.

12. The method as claimed in claim 1, further comprising a step of terminating the displacement of said membrane element within said pressure vessel by extracting said membrane element from the distal end of said pressure vessel.

13. A method for manipulating a membrane element within a pressure vessel, said pressure vessel having a central axis, a distal end, a proximal end and an inlet disposed at said proximal end, said membrane element having a membrane element front face with at least one fluid opening and a membrane element rear face, said membrane element being received within said pressure vessel such that said membrane element front face faces said proximal end, with a possibility to be moved along said central axis by an axial force applied to said membrane element front face, said method comprising steps of:

disposing an end plate at the inlet at the proximal end and a fluid-tight element in said pressure vessel so as to form a fluid chamber at said proximal end between said inlet and said fluid-tight element, said fluid-tight element being configured for sealingly mounted with respect to an inner surface of the pressure vessel so as to prevent the membrane element and the passage between the membrane element and the inner surface from receiving therein fluid from said fluid chamber; and introducing fluid into said fluid chamber so as to build a fluid pressure within said fluid chamber forcing said fluid-tight element to move away from said inlet and to apply an axial force on said membrane element, thereby displacing the membrane element along said central axis in the direction towards said distal end of the pressure vessel.

14. The method as claimed in claim 13, wherein said step of disposing a fluid-tight element in the pressure vessel further comprises a step of causing said fluid-tight element to abut said membrane element front face while preserving the sealing between an inner surface of the pressure vessel and the fluid-tight element.

15. The method as claimed in claim 13, wherein the fluid-tight element has a front member face corresponding in shape and dimensions to the membrane element front face for at least partially sealing it.

16. The method as claimed in claim 13, wherein said pressure vessel has a cylindrical inner surface with a diameter D1, said membrane element front face has a circular shape with a diameter D2, and said fluid-tight element has a circular shape with a diameter D3, such that $D3<D2<D1$ or $D2 \leq D3<D1$.

17. The method as claimed in claim 13, wherein said membrane element has a central fluid passage having a front passage end at said membrane element front face and a rear passage end at said membrane element rear face, and wherein a number of fluid openings comprising said at least one fluid opening are disposed around said front passage end, and said fluid-tight element has a plug configured for being received at said front passage end when the fluid-tight element is mounted within said pressure vessel.

18. The method as claimed in claim 13, further comprising a step of controlling the fluid pressure of fluid in said fluid chamber, thereby controlling the displacement of said membrane element within said pressure vessel.

* * * * *